Aug. 14, 1956 B. M. OLIVER 2,759,044

BEAM APERTURE CORRECTION IN HORIZONTAL AND VERTICAL DIRECTION

Filed Nov. 24, 1950 3 Sheets-Sheet 1

INVENTOR
B. M. OLIVER
BY Hugh S. Wertz
ATTORNEY

Aug. 14, 1956 B. M. OLIVER 2,759,044

BEAM APERTURE CORRECTION IN HORIZONTAL AND VERTICAL DIRECTION

Filed Nov. 24, 1950 3 Sheets-Sheet 2

INVENTOR
B. M. OLIVER
BY *Hugh S. Wertz*
ATTORNEY

INVENTOR
B. M. OLIVER
BY Hugh S. Wertz
ATTORNEY 2,759,044

BEAM APERTURE CORRECTION IN HORIZONTAL AND VERTICAL DIRECTION

Bernard M. Oliver, Morristown, N. J., assignor to Bell Telephone Laboratories, Incorporated, New York, N. Y., a corporation of New York Application November 24, 1950, Serial No. 197,466

2 Claims. (Cl. 178—7.5)

This invention relates to television systems, and more particularly to equalizing arrangements for use in such systems.

Because of the finite dimensions of the exploring and reproducing spot and the finite center-to-center spacing of the vertical height in the scanning path, there is appreciable impairment in the reproduction of the picture detail by the television scanning process. In particular, because the scanning spot is of finite size, it averages the light intensity over a certain portion of the image, and all fine detail contained within this area tends to be suppressed. Thus the spot acts like a low-pass filter and attenuates the finer detail or higher frequency components. Since each of the scanning spots (at both the sending and receiving ends) acts like a separate individual filter the total filtering action obtained is the effect of the two in tandem.

Accordingly, for a good crisp picture at the viewing screen, it is important to compensate for this filtering effect. The use of equalizing systems in the intermediate electrical stage offers a convenient and practical method for effecting the desired compensation. Accordingly, the principal object of this invention is to compensate for this distortion in this way.

Because of the symmetrical shape of the usual exploring and reproducing apertures in use in television systems, the effective filter characteristic has a linear associated phase. Therefore, in order to avoid overall phase distortion it is important that the equalizing system introduced also exhibit a linear phase characteristic at all frequencies in the pass band.

In previously developed equalizing networks, the equalizing system usually comprises two separate filters, made up of lumped inductances and capacitances, and of which one is an attenuation equalizing filter which however incidentally introduces some phase distortion, and the other is an all-pass structure for correcting this introduced phase distortion. However, such equalizing systems are complex, and more particularly are not as readily variable as is desirable to facilitate easy adjustment and simple operation.

A related object therefore is to provide a variable equalizing system having inherently a linear phase characteristic.

However, in the event that the scanning apertures have an asymmetric shape or that the intermediate electrical system has some delay or phase distortion, it is then desirable to provide phase as well as amplitude equalization. In this case, the invention can be readily adapted to provide this sort of equalization as well.

These and related objects are realized in accordance with the invention in an equalizing system which comprises a delay system to which input energy is supplied at one end to be dissipated in the termination resistance at the opposite end with a minimum of reflection. Signals are derived from a number of points disposed along the delay system. These signals are appropriately weighted and then are combined in a predetermined manner by electronic devices to provide the suitably equalized output signal.

In a specific illustrative embodiment of the invention, a main signal, corresponding to an individual element of the picture scene, is combined with secondary signals corresponding to the preceding and succeeding elements of the same horizontal line to provide equalization in the horizontal picture direction; and similarly the main signal is combined with secondary signals corresponding to the corresponding elements of the preceding and succeeding scanning lines to provide equalization in the vertical picture direction.

The invention will be more fully understood by reference to the following more detailed description taken in conjunction with the accompanying drawings forming a part thereof in which.

Figure 1:
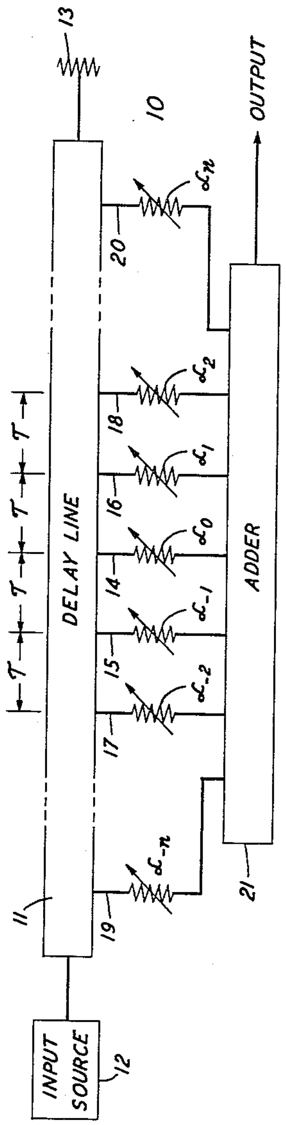
Fig. 1 shows, in block diagram form, an exemplary embodiment of an equalizing system in accordance with the invention.

Referring more particularly to the drawings, in Fig. 1, an equalizing arrangement 10 designed especially for amplitude equalization to be illustrative of the invention is shown in block schematic form. This arrangement comprises a substantially lossless delay line 11 which, for example, can be a delay cable or a series of cables, one end of which is supplied with the input signal from a source 12, and the other end of which is terminated in the characteristic impedance 13 of the line in order to minimize reflections back along the line. Symmetrically disposed about a main central tap 14, there are a plurality of pairs of secondary taps of which each pair is separated from the central tap by successive integral multiples of a base delay $\tau$. By way of illustration there are shown the two pairs nearest the central tap, comprising taps 15 and 16, and 17 and 18, and the outermost pair made up of taps 19 and 20. The number of pairs necessary is determined by the degree of equalization desired. There is associated with each tap an attenuation section, representing the amounts by which the signals at the various secondary taps are to be attenuated with respect to the main signal from the central tap 14. Corresponding to the main tap 14 and the secondary pairs 15 and 16, 17 and 18, and 19 and 20, these attenuation sections are designated $\alpha_0$, $\alpha_{-1}$ and $\alpha_1$ and $\alpha_{-2}$ and $\alpha_2$, and $\alpha_{-n}$ and $\alpha_n$, respectively. In the event that no phase equalization is necessary, the attenuation $\alpha_k$ is made equal to the attenuation $\alpha_{-k}$. However, if both phase and amplitude equalization are desired, attenuation $\alpha_k$ will in general not be equal to attenuation $\alpha_{-k}$. The signals from all of the taps are supplied to the adder 21 for summation into the output signals. The output signal is therein derived as a predetermined combination of these weighted tapped signals.

It will be useful to analyze the operation of the equalizing arrangement 10. If $f_1(t)$ is the video signal derived by the exploring mechanism in scanning horizontally across a vertical line of infinitesimal width of the image scene, then the equivalent filter characteristic of the exploring aperture for horizontal resolution can be written as the Fourier transform $$F_1(\omega)=\int_{-\infty}^{\infty} f_1(t)e^{-i\omega t}dt$$

Similarly if $f_2(t)$ is the beam current delivered by the reproducing mechanism to a vertical line of infinitesimal width on the viewing screen when scanning horizontally with constant beam current, then the equivalent filter characteristic of the reproducing aperture can be written as the Fourier transform $$F_2(\omega)=\int_{-\infty}^{\infty} f_2(t)e^{-i\omega t}dt$$

The effective filter characteristic of the two apertures in tandem is:

$$F_0(\omega)=F_1(\omega)F_2(\omega)$$

Since both the functions $f_1(t)$ and $f_2(t)$ are always positive, it follows from the principles of Fourier transforms that $F_1(\omega)$, $F_2(\omega)$ and $F_0(\omega)$ are decreasing functions of frequency, i. e. $F(\omega)\leqq F(0)$. This means that high frequency signal components are always attenuated more by the aperture characteristics than the direct-current and low frequency components.

Obviously this relative discrimination against the higher frequency components of the signal can be compensated by passing the signal through an equalizing arrangement whose transmission as a function of frequency $Y(\omega)$ is such that $Y(\omega)F_0(\omega)$ equals a constant.

Referring to the equalizing system 10 of Fig. 1, if the time scale is shifted so that the signal out of the main tap 14 is assumed to have zero delay, and if $f(t)$ is the input signal so delayed, then the output signal $g(t)$ derived by combining the signals from a series of $2n+1$ is $$g(t)=\sum_{k=-n}^{k=n}\alpha_k f(t-k\tau)$$

If $F(\omega)$ and $G(\omega)$ are the Fourier transforms of $f(t)$ and $g(t)$ respectively, then $$G(\omega)=F(\omega)\sum_{-n}^{n}\alpha_k e^{-ik\omega\tau}$$

The filter characteristic of the equalizer is therefore:

$$Y(\omega)=\frac{G(\omega)}{F(\omega)}=\sum_{-n}^{n}\alpha_k e^{-ik\omega\tau}$$

$$Y(\omega)=\alpha_0+\sum_{1}^{n}(\alpha_{-k}+\alpha_k)\cos k\omega\tau+i\sum_{1}^{n}(\alpha_{-k}-\alpha_k)\sin k\omega\tau$$

For pure amplitude equalization, it follows that $$\alpha_{-k}=\alpha_k$$

We then have $$Y(\omega)=\alpha_0+2\alpha_1\cos\omega\tau+2\alpha_2\cos 2\omega\tau+\ .\ .\ .$$

which is purely real.

In addition, the attenuation coefficients $\alpha_{-n}\ .\ .\ .\ \alpha_n$ can be adjusted to obtain any even function of frequency over the band $-W<f<W$ provided the delay, $\tau$ between taps is made equal to $$\frac{1}{2W}$$

(W is the band of frequencies to be transmitted.) The attenuation constant $\alpha_{-n}\ .\ .\ .\ \alpha_n$ are then simply the Fourier coefficients describing the desired $Y(\omega)$ over the band $-W$ to W. If some of these coefficients are negative (as will be the case if $Y(\omega)>Y(O)$ at any frequency of interest), then the corresponding secondary signals are subtracted from the main signal; those positive are added.

Figure 2A:
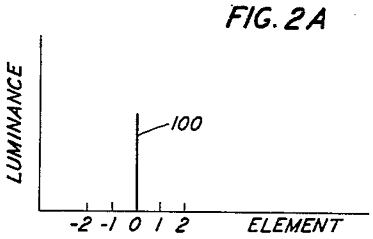
Figs. 2A and 2B are graphical representations to simplify understanding of the equalizing process.
Figure 2B:
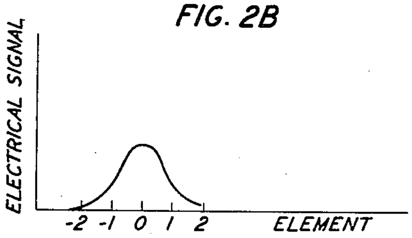

Figs. 2A and 2B are simple graphical representations to facilitate understanding of the problem. In Fig. 2A, there is shown a sharp line 100 at an element *o* in the field being scanned. As a result of the finite dimensions of the scanning aperture, such a line will produce an electrical signal which, for example, resembles the curve of Fig. 2B, wherein there is some spillover into adjacent elements, simulating luminance output from these elements.

It can be seen that for equalization, it is important that the signal from elements adjacent to the element *o* be corrected for this spillover. In the present invention, this equalization is obtained by modifying the main signal representative of each element with predetermined portions of the secondary signals from elements adjacent thereto. The equalizing arrangement 10, described with reference to Fig. 1, substantially accomplishes this.

Figure 3:
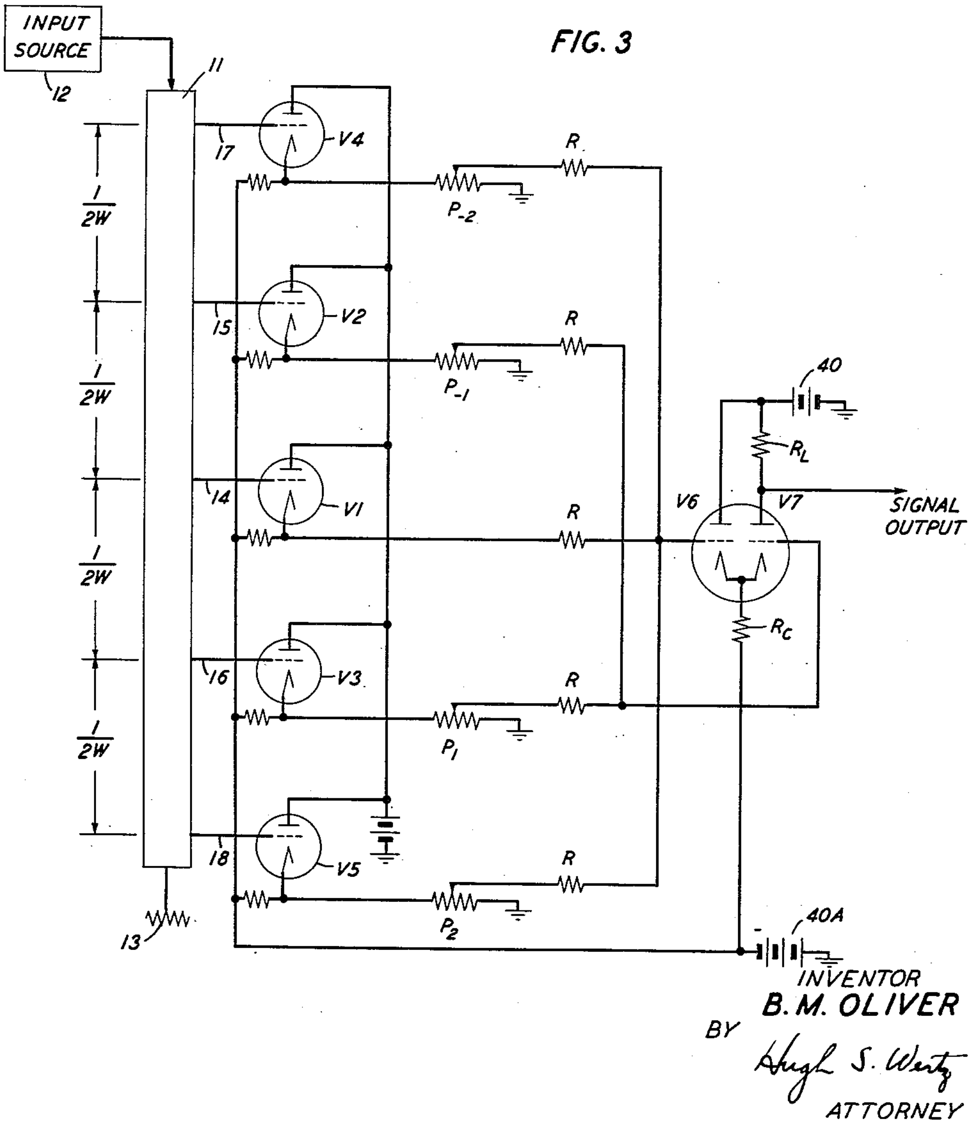
Fig. 3 shows diagrammatically a more specific embodiment of an equalizing system in accordance with the invention.

In Fig. 3, there is illustrated diagrammatically an exemplary embodiment for combining the various secondary signals with the main signal. An input signal is supplied from a source 12 to one end of a delay line 11, the other end of which is terminated in the characteristic impedance 13 of the line. Symmetrically disposed about a main tap 14, and separated by intervals of $$\frac{1}{2W}$$

where W is the band of frequencies to be transmitted, are a plurality of pairs of secondary taps. By way of illustration two such pairs are shown here, 15 and 16, and 17 and 18. To avoid reflections back into the delay line, it is desirable to supply isolating means at each tap. The use of a cathode follower at each tap offers one convenient method therefor. To this end, the taps 14, 15, 16, 17, and 18 supply the cathode followers V1, V2, V3, V4 and V5, respectively. In order to allow adjustment of the outputs from the secondary taps to permit their combination in a predetermined manner, the cathode followers V2, V3, V4, and V5 are provided with potentiometers $P_{-1}$, $P_1$, $P_{-2}$, and $P_2$ respectively. In this way the various outputs can be adjusted in accordance with the desired attenuations $\alpha_{-1}$, $\alpha_1$, $\alpha_{-2}$, $\alpha_2$, respectively. As discussed hereinabove, if no phase equalization is necesary $\alpha_k$ is equal to $\alpha_{-k}$, in which case the potentiometers $P_k$ and $P_{-k}$ can be ganged together to simplify adjustment thereof. Further by way of example, it is here assumed that the attenuation coefficients $\alpha_{-1}$ and $\alpha_1$ are negative, necessitating the subtraction of the corresponding signals in the summation process. The summation is obtained in a differential amplifier which comprises the double triode having a first section V6 and a second section V7. Signals of positive sign, weighted in accordance with the attenuation coefficients, are supplied to the grid of one section and signals of negative sign, also weighted, are supplied to the grid of the other section for summation by the differential amplifier. Each signal is supplied by way of its "mixing" resistor R to the appropriate grid. To obtain the differential action, the cathodes of sections V6 and V7 are connected together and then through the common cathode resistance $R_c$ to the negative terminal of the voltage supply 40A. For good differential action, it is important that $R_c$ be considerably greater than $$\frac{1}{gm}$$

where *gm* is the transconductance of each of the sections V6 and V7. The output signal is derived across the load resistance $R_L$ in the plate circuit of the second stage V7. It should be obvious that this technique can be employed for the summation of as many signals as may be desired. Moreover the means specifically described here for obtaining the desired isolation for weighing the various secondary signals, and for summing the weighted portions into the combined output, are intended merely by way of example. However, it will be evident that this arrangement is capable of combining the various signals with little reflection and interaction.

In particular, for the more usual case wherein no phase equalization is necessary, a simple and quite effective equalizer is obtained by the use of only three taps on the delay line, which comprise a center tap and the two ends of the line. This amounts to omitting the attenuation coefficients $\alpha_k$ for $k>1$, and accepting equalization of the form $$Y(\omega)=1+K\cos\omega\tau$$

If the scanning apertures are small, this family of curves will contain a member (some K) which provides satisfactory equalization over the pass band. In practice it is sometimes found desirable even to over-equalize.

For horizontal equalization, such a three tap system can be interpreted as a system which combines a main signal corresponding to a picture element with weighted portions of the signal corresponding to the preceding and succeeding picture elements on the same horizontal scanning line. In this way, there is obtained for reproducing the image scene, a signal which has been corrected for the finite size of the scanning apertures in the horizontal direction, by correlation with adjacent elements.

This same technique can be extended to provide substantial equalization in the vertical direction both for the finite dimensions of the scanning apertures and for the spacing between the successive scanning lines by appropriately adjusting the delay between the signal from the main tap and the signals from the secondary taps.

Figure 4:
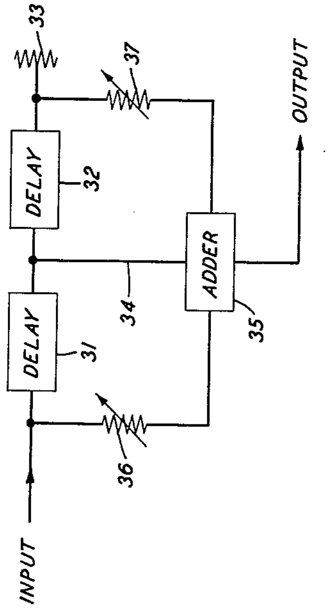

In Fig. 4 there is shown a three tap system, according to the invention, for vertical equalization for sequential scanning. In this system, the input signal is supplied to one end of a substantially lossless delay line comprising two sections 31 and 32, each of which has a delay time of one horizontal line, and the other end of the delay line is terminated in the characteristic impedance 33. The main signal is derived from a central tap 34 between the two sections and is combined in the adder 35 for summation with the secondary signals derived from taps at the two ends of the delay line, appropriately weighted by means of the attenuation sections 36 and 37. It is evident that by adjusting the delay time of the delay sections in this manner, there is derived as the output signal for each element of the picture scene a signal which has been modified by the signals from the corresponding elements in the preceding and succeeding scanning lines.

Figure 5:
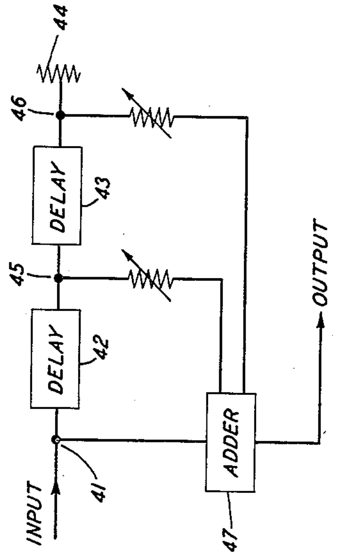
Figs. 4 and 5 show, in block schematic form, additional arrangements, in accordance with the invention, for equalization in the vertical picture direction for sequential and interlaced scanning systems, respectively.

In Fig. 5, there is shown a three tap system according to the invention for vertical equalization for an interlaced scanning system. In this system, the main tap 41 is supplied from the source of the input signals. The input signals are also supplied to a substantially lossless delay line comprising two sections, 42 and 43, of which the first 42 has a delay time equal to the time of one television field less half a television line, and the second 43 has a delay time equal to the time of one television line. The whole delay line is terminated as hitherto in the characteristic impedance 44. In this case, the secondary signals are derived by means of the taps 45 and 46 which are across the delay line 43. Thereafter, the main signal and the two secondary signals properly weighted are combined as hitherto in the adder 47 for summation into the output signal. In this manner there is derived for each element of a particular horizontal line of the picture scene an output signal which has been correlated with the corresponding elements of the two lines of the preceding field which bracket the particular line.

It can be appreciated that in general other techniques can be employed for realizing the necessary delay times. In particular, it may be preferable to utilize storage tubes or related devices to obtain long delay intervals, as for example, a television field time.

It will be evident that equalization in both horizontal and vertical picture directions can be obtained by employing two appropriate arrangements of the kind hereinbefore described in a cooperative relationship, as for example, in tandem. As a matter of fact, by a suitable chain of delay lines whose taps supply a common adder, compensation can be achieved in both directions in a single system.

Figure 6:
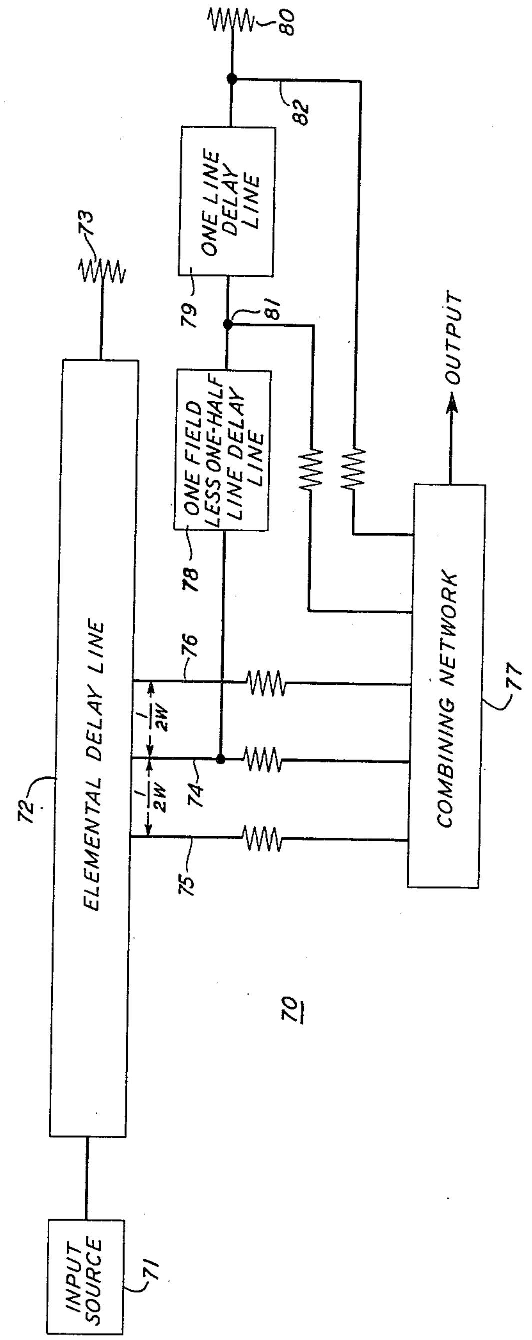
Fig. 6 shows, in block schematic form, an arrangement for equalizing in both the vertical and horizontal directions in an interlaced scanning system.

In Fig. 6, for example, there is shown in block schematic form, a suitable arrangement 70 for equalizing simultaneously in both the horizontal and vertical directions. It can be seen that, in effect, this arrangement 70 combines in a cooperative relationship the functions of the arrangements shown in Figs. 1 and 5. The input television signal is applied from the source 71 to the input end of a delay line 72, which like the delay line in Fig. 1 can either be an artificial line of lumped characteristics or else can be a solenoid-type delay cable of the kind described on pages 647 through 657 of the "Proceedings of the Institute of Radio Engineers," September 1946, in an article by H. E. Kollman entitled "Equalized Delay Lines." The other end of the delay line is terminated by the impedance 73 in a way to avoid reflections. Symmetrically disposed about a main tap 74, and separated therefrom by intervals of ½ W where, as above, W is the band width of the signal, are the secondary taps 75 and 76, whose outputs then represent the intensity of elemental areas succeeding and preceding, respectively, in the same line the elemental area whose intensity is represented by the output from the main tap 74. These various outputs, after appropriate weighting as described above, are supplied to a combining network 77, of which one suitable form has been described above in connection with Fig. 3. In this way, there can be effected equalization in the horizontal direction. Additionally, for equalization in the vertical direction, the signal derived from the main tap 74 is also applied as an input to delay line 78, which like delay line 42 in Fig. 5 is designed to insert a delay of one television field less one half a line time. For delays of this order, it is usually preferable to utilize electromechanical delay means of which one suitable form is described on pages 1 through 25 of the "Journal of Acoustical Society of America," January 1948, in an article by D. L. Arenberg entitled "Ultrasonic Solid Delay Lines," together with such amplifying means as is necessary to maintain the signal level at its original amplitude. Alternatively, delays of this kind can be achieved with electrostatic storage devices of the kind well known in the art as storage tubes. Additionally, the output of delay line 78 is applied as in Fig. 5 to a delay line 79 which inserts a further delay of one line time and corresponds to delay line 43 of that figure. Delay line 79 as well as delay line 43 are preferably electromechanical delay lines of the kind described in the article by D. L. Arenberg. To minimize reflection effects, delay line 79 is terminated by impedance 80. The outputs derived at taps 81 and 82, representing respectively the outputs of delay lines 78 and 79, are also applied after weighting to the combining network 77 for summation. These two outputs represent the intensities derived for the elemental areas which are in the television field immediately preceding that of the elemental area whose intensity is represented by the output of tap 74 and which are in corresponding horizontal positions of the two horizontal lines which bracket the line of the elemental area represented by the output of tap 74. In this way, there is made available at the output of the combining network 77 a useful output which is corrected for aperture effects in both the horizontal and vertical directions.

Moreover, it should be evident that by utilizing more secondary taps on delay line 72 together with taps on delay line 79 more precise equalization can be effected.

It is to be understood that all of the above-described arrangements are merely illustrative of the principles of the invention. Numerous other arrangements may be devised by one skilled in the art without departing from the spirit and scope of the invention.

What is claimed is:

1. In a television system including an input source of video signals, an equalizing arrangement to compensate for the finite aperture loss in both the horizontal and vertical directions of an image raster of interlaced horizontal lines, said arrangement comprising a first delay network supplied with video input signals from said source and having a plurality of taps symmetrically disposed about a central main tap, said taps being separated along said first delay network by a time delay equal to ½ W where W is the bandwidth of said input video signals, means for deriving from the central main tap a main signal corresponding to a particular element of a line of the picture scene, means for deriving from the remaining taps signals corresponding to picture elements of said line of the picture scene separated by ½ W delay, a second delay network supplied with the signal derived from said central main tap of said first delay network for providing a delay of substantially one television field less one half a television line time in tandem with a third delay network for providing a delay of substantially one television line time, a combining network for algebraically combining the signals applied thereto, and means for applying signals derived from said taps on said first delay network and from the outputs of said second and third delay networks to the combining network with predetermined relative magnitudes and polarities to produce a compensated subject-representative signal for utilization.

2. In a television system including an input source of subject-representative signals, an equalizing arrangement to compensate for the finite aperture loss in the horizontal and vertical directions of an image raster of interlaced horizontal lines, said equalizing arrangement comprising a first delay network supplied with said input signals having a plurality of taps symmetrically disposed about a central main tap, said taps being separated along said first delay network by a time delay equal to ½ W where W is the bandwidth of the said input signal, means comprising a cathode follower amplifier for deriving from the central main tap a main signal corresponding to a particular element of a line of the picture scene, means comprising a plurality of cathode follower amplifiers for deriving from the remaining taps signals corresponding to picture elements of said line separated by said ½ W delay, a second delay network supplied with the signal derived from said central main tap of said first delay network for providing a delay of substantially one television field less one half a television line time in tandem with a third delay network for providing a delay of substantially one television line time, and a combining network comprising a differential amplifier for algebraically combining the signals applied thereto, and means for applying signals derived from said taps on said first delay network and from the outputs of said second and third delay networks to said combining network with predetermined relative magnitudes and polarities to produce a compensated subject-representative signal for utilization.

References Cited in the file of this patent

UNITED STATES PATENTS

| | | |
|---|---|---|
| 2,263,376 | Blumlein et al. | Nov. 18, 1941 |
| 2,273,163 | Wilson | Feb. 17, 1942 |
| 2,273,172 | Beers | Feb. 17, 1942 |